UNITED STATES PATENT OFFICE.

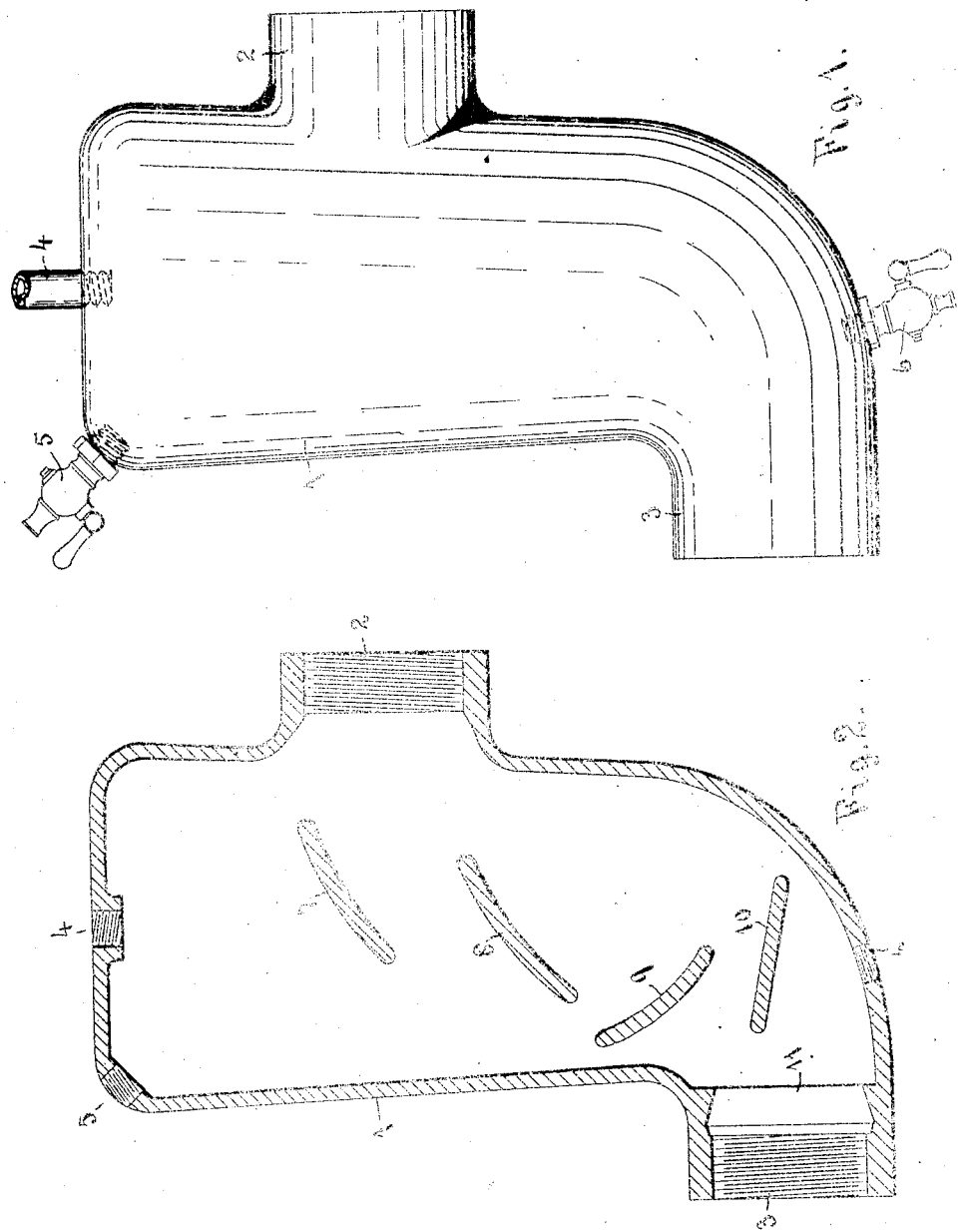

EDWIN AUGUSTUS HALL, OF DANSVILLE, AND FRANCIS G. HALL, JR., OF NEWBURGH, NEW YORK.

EXHAUST-SILENCER.

945,523.  Specification of Letters Patent.  Patented Jan. 4, 1910.

Application filed June 16, 1909. Serial No. 502,501.

*To all whom it may concern:*

Be it known that we, EDWIN A. HALL and FRANCIS G. HALL, Jr., citizens of the United States, residing, respectively, at Dansville, Livingston county, and Newburgh, Orange county, in the State of New York, have invented certain new and useful Improvements in Exhaust-Silencers, of which the following is a specification.

This invention relates to improvements in devices for silencing the exhaust from internal combustion engines, and the object of our invention is to provide a device of this character whereby the noise of the escaping exhaust will not only be silenced effectually but also the exhaust gases will be so cooled and condensed as to relieve the engine from back pressure.

We attain our object by constructing the silencer in the manner illustrated in the accompanying drawings, in which—

Figure 1 presents a side elevation thereof; and Fig. 2, a vertical section.

Like numerals designate like parts in the two views.

The body of the silencer, 1, is preferably in the form of a hollow inverted cone; the exhaust from the engine being conducted into the chamber of the silencer through the inlet 2, and being discharged therefrom at the bottom through the outlet 3. At the top of the silencer there is a water pipe connection at 4, through which water is introduced into the chamber of the silencer, from any suitable source of supply. In general, this will be from the circulating water taken from the engine jacket. At 5, we provide a pet cock to relieve pressure in the silencer when starting the engine; and at the bottom of the silencer we provide at 6 a pet cock for draining the silencer of any water which may collect therein after or before running the engine.

Transversely across the chamber of the silencer we provide a series of baffle plates 7, 8, 9, and 10, arranged preferably in the manner illustrated in Fig. 2. The baffle plates 7 and 8 are positioned opposite the inlet 2, with the baffle plate 7 positioned directly under the water inlet 4. The function of this baffle plate 7 is two fold:—first, it serves as a splasher for the water entering at 4, and striking it from above; and second, it is so placed that the incoming charge of exhaust gas striking it on the underside will be deflected downward. The baffle plate 8 is so arranged as to divide the incoming charge of exhaust gas into two parts and deflect it downward. The baffle plates 9 and 10 are so arranged as to change the direction of the exhaust gas in passing through the silencer, and cause a thorough mixing of the charge with the water which is being splashed and sprayed from baffle plate 7 into the lower portion of the silencer chamber. In so positioning the baffle plates 9 and 10 we have aimed to accomplish the result of mixing the water and heated exhaust charge with as little frictional loss as possible.

The exhaust gas, on entering the chamber of the silencer, expands in the enlarged upper end thereof, and is deflected downward with the water spray, the baffle plates producing a swirling effect in the lower part of the chamber. The gas is thus thoroughly mixed with the water, and cooled and condensed thereby, the water becoming vaporized by its admixture with the heated gas. The combined gas and vapor will then pass off through the outlet 3 in a thoroughly cooled condition, and without noise. This expansion and subsequent condensation of the gas will entirely relieve the engine from back pressure. In order that there may be a full discharge through the outlet 3, we slightly constrict the inward end of the passageway leading to said outlet at 11, thence gradually enlarging the opening to its normal size; thus applying the principle of the Venturi tube to the exhaust outlet, so that the outflowing stream of gas will fill the outlet pipe to its full capacity without the formation of a *vena contracta*.

To obtain the best results we preferably arrange the baffle plates as illustrated in Fig. 2, as from experience we believe that this arrangement produces the utmost efficiency in effecting the silencing and condensing of the exhaust. The principal features of the invention, however, we consider to be the arrangement of the baffle plate 7 relatively to the gas inlet 2 and to the water inlet 4.

While this silencer is specially adapted for marine engines it may be employed to advantage in connection with any internal combustion engine where the necessary water supply may be obtained for producing the condensation within the silencer.

What we claim as our invention and desire to secure by Letters Patent is—

1. A silencer comprising a chamber having a lateral gas inlet at its upper end and a discharge outlet at its lower end, a baffle plate opposite the inlet, and means for admitting a stream of water to the chamber upon the top of the baffle plate.

2. A silencer comprising a chamber having a lateral gas inlet at its upper end and a discharge outlet at its lower end, an inclined baffle plate opposite the inlet to deflect the gas downward, and means for admitting a stream of water to the chamber upon the top of the baffle plate.

3. A silencer comprising a chamber having a lateral gas inlet at its upper end and a discharge outlet at its lower end, two inclined baffle plates one above the other opposite the inlet to divide the inflowing gas and deflect it downward, and means for admitting a stream of water to the chamber upon the top of the upper baffle plate.

4. A silencer comprising a chamber having a lateral gas inlet at its upper end and a discharge outlet at its lower end, an inclined baffle plate opposite the inlet to deflect the gas downward, means for admitting a stream of water to the chamber upon the top of said baffle plate, and one or more baffle plates in the lower portion of the chamber set at an opposite incline to that of the first.

5. A silencer comprising a chamber having a gas inlet at one side adjacent its upper end and a discharge outlet on the opposite side at its lower end, the inclined baffle plates 7 and 8 opposite the inlet to deflect the inflowing gas downward, the oppositely inclined baffle plates 9 and 10 adjacent the outlet, and means for admitting a stream of water to the chamber upon the top of plate 7.

In testimony whereof we have affixed our signatures in presence of two witnesses.

EDWIN AUGUSTUS HALL.
FRANCIS G. HALL, Jr.

Witnesses as to E. A. Hall:
ROBERT PRATT,
FRED L. COVERT.

Witnesses as to F. G. Hall, Jr.:
C. W. BEEBE,
H. B. MAXWELL.